United States Patent
Le et al.

(10) Patent No.: US 8,338,549 B2
(45) Date of Patent: Dec. 25, 2012

(54) POLYOLEFIN DERIVED FROM RENEWABLE RESOURCES, AND METHOD FOR PRODUCING SAME

(75) Inventors: Guillaume Le, Colombelles (FR); Jean-Laurent Pradel, Boisney (FR); Samuel Devisme, Rouen (FR); Thomas Roussel, Lyons (FR); Jean-Luc Dubois, Millery (FR)

(73) Assignee: Arkema France, Colombes (FR)

( * ) Notice: Subject to any disclaimer, the term of this patent is extended or adjusted under 35 U.S.C. 154(b) by 87 days.

(21) Appl. No.: 13/119,863
(22) PCT Filed: Sep. 22, 2009
(86) PCT No.: PCT/FR2009/051785
§ 371 (c)(1), (2), (4) Date: Apr. 26, 2011
(87) PCT Pub. No.: WO2010/031984
PCT Pub. Date: Mar. 25, 2010

(65) Prior Publication Data
US 2011/0196114 A1 Aug. 11, 2011

(30) Foreign Application Priority Data
Sep. 22, 2008 (FR) ...................................... 08 56347

(51) Int. Cl.
C08F 2/00 (2006.01)
C08F 10/14 (2006.01)
C08F 2/34 (2006.01)
C08F 2/12 (2006.01)
C08F 2/04 (2006.01)
(52) U.S. Cl. ......................................... 526/75; 526/348
(58) Field of Classification Search .................... 526/75, 526/348
See application file for complete search history.

(56) References Cited

FOREIGN PATENT DOCUMENTS
WO WO 2008/067627 * 6/2008

* cited by examiner

*Primary Examiner* — William Cheung
(74) *Attorney, Agent, or Firm* — Buchanan Ingersoll & Rooney (57) ABSTRACT

The invention relates to a polymer obtained by polymerizing olefins having 6 to 9 carbon atoms and partially derived from renewable resources. In particular, the polymer according to the invention can be derived from vegetable oil or animal fat. The invention also relates to the method for producing the polymer.

19 Claims, 1 Drawing Sheet

US 8,338,549 B2

POLYOLEFIN DERIVED FROM RENEWABLE RESOURCES, AND METHOD FOR PRODUCING SAME

This application is a National Stage of PCT International Application No. PCT/FR09/51785, filed Sep. 22, 2009, which claims priority under 35 U.S.C. Section.119 to France Application No. 0856347, filed Sep. 22, 2008, the entire disclosures of which are herein expressly incorporated by reference.

FIELD OF THE INVENTION

The present invention relates to a polymer produced from renewable starting materials and to the process for producing same.

More specifically, the subject of the invention is a polymer obtained by polymerization of an olefin, derived from renewable materials, having a number of carbon atoms included in the range of from 6 to 9.

Among the polymer families, polymers obtained from olefins (alternatively polyolefins) have very varied properties (for example, mechanical or melt viscosity properties).

When these polyolefins are oligomers (i.e. when they have a number-average molar mass of less than or equal to 2000 g/mol), they are in the liquid or viscous state at ambient temperature and can be used, for example, as a lubricant.

When the number-average molar mass is greater than 2000 g/mol, the polyolefins may be solid at ambient temperature. It is thus possible to produce, from these polyolefins, films, molded or injection-molded components, tubes or else bottles by means of highly varied forming techniques. They can be used in many fields, in particular packaging or the motor vehicle industry.

Polyethylene and polypropylene are the most common polyolefins.

Mention may also be made of polyolefins comprising olefins having a number of carbon atoms greater than or equal to 5 (for example in the range of from 6 to 9). These olefins can be polymerized with one another or with other monomers. In particular, they can be polymerized with olefins having a low number of carbon atoms (generally 2 or 3). For example, starting from ethylene and an olefin having a number of carbon atoms greater than or equal to 5, it is possible to produce a polyethylene, for example of LLDPE (linear low-density polyethylene) type, which is a random copolymer of ethylene and of an additional olefin having a higher number of carbon atoms.

The polyolefins can be obtained by polymerization of olefins derived from oil products.

To obtain these olefins, a process comprising a step of cracking crude oil followed by a step of steam cracking of the alkanes produced during the preceding cracking step is generally used. Various products are obtained, among which are olefins.

One drawback of this cracking and steam cracking process is that it requires large amounts of energy associated with a high temperature during the process (about 800° C. for the steam cracking step).

Another drawback is that the oil products obtained at the end of this process are very varied: a mixture of products is obtained, among which are olefins (but also aromatic compounds, alkanes, etc.). The olefins produced are also varied.

It is possible to produce olefins from fossil resources (oil) by carrying out ethylene oligomerization, which is today the most widespread process. A great variety of these processes is developed in Ullmann's Encyclopedia 5$^{th}$ edition, volume A13, pages 238 to 248. These processes make it possible to obtain a range of olefins of C4/C6 to C20 and more. However, most that exist to date produce mixtures of olefins, in particular numerous isomers, which must then be isolated so that they can be polymerized. However, these separation processes, in particular isomer separation processes, are complex and very expensive. For this reason, a process comprising a step which makes it possible to produce predominantly one olefin with a very limited number of isomers has great advantages.

Another problem posed by the polyolefins derived from oil products is the intense exploitation of fossil resources, which inevitably leads to exhaustion thereof. Extraction becomes increasingly difficult (very deep wells), and this therefore requires heavy and expensive equipment. Likewise, a large increase in the price of oil products since the crisis of 1973 has been observed. One consequence is the increase in production costs for polymers produced mainly from products of oil origin. For these reasons, there has, over the past few years, been an increasing interest in polymers derived from renewable starting materials. Specifically, mention may be made, for example, of polymers such as poly(lactic acid) derived from the polymerization of lactide, a monomer synthesized from beetroot or corn, for example. Mention may also be made of polyamide 11 obtained from oil extracted from the castor oil plant (sold under the trademark Rilsan® by the applicant). One of the advantages of these polymers derived from renewable starting materials concerns the carbon cycle: specifically, these plants absorb atmospheric carbon dioxide ($CO_2$) such that this carbon is termed "contemporary", unlike fossil carbon (derived, for example, from oil or coal). The use and the release of fossil carbon causes its accumulation in the atmosphere and an imbalance of the carbon cycle.

Application WO2008/067627 describes a process for producing polyolefin from olefins containing from 2 to 4 carbon atoms starting from renewable resources. In particular, the step of olefin synthesis for producing this polyolefin comprises a biomass gasification step. This step is carried out at very high temperature (generally between 1100° C. and 1300° C.), which implies high energy consumptions for this step. If this energy is of fossil origin, it then contributes to the release of greenhouse gases (including $CO_2$) leading to the accumulation effect.

To date, none has addressed the synthesis of polymers obtained from olefins having a number of carbon atoms included in the range of from 6 to 9 carbon atoms, derived from renewable resources. This is one of the subjects of the present invention.

Surprisingly, the inventors have implemented a process for the industrial production of polyolefins from renewable starting materials.

The process according to the invention makes it possible to at least partly do away with starting materials of fossil origin and to replace them with renewable starting materials.

The polyolefins obtained according to the process according to the invention can be used in all the applications in which it is known practice to use these same polymers derived from oil resources.

SUMMARY OF THE INVENTION

A subject of the invention is a process for producing a polymer obtained by polymerization of constituent monomers, at least one of which, called olefin (a), is at least partially derived from renewable resources and corresponds to the formula $C_nH_{2n}$ in which n is an integer included in the range of from 6 to 9.

The process according to the invention makes it possible to synthesize a novel polymer comprising contemporary carbon, from olefins having a number of carbon atoms ranging from 6 to 9. Thus, another subject of the invention is a polymer that can be obtained by means of the process of the invention.

The polymer according to the invention solves at least one of the various problems that follow: the fact that it comprises contemporary carbon; this part of carbon does not contribute to $CO_2$ accumulation in the atmosphere. The production of this polymer can generate less greenhouse gas than the same polymers derived from fossil origin since the polymer according to the invention can be produced by means of a process that consumes less energy. In addition, the process for producing this polymer is facilitated in comparison with the conventional processes using olefins derived from oil products since the olefin (a) has fewer isomers. Another advantage is that the production process can be carried out in production units located at the site of production of the starting materials. In addition, the size of the production units for the process according to the invention is much smaller than the size of a refinery: refineries are in fact large plants generally located far away from starting material production centers and supplied by pipelines.

Furthermore, the polymers according to the invention comprise olefins having a number of carbon atoms ranging from 6 to 9. These polymers cannot be produced, to the applicant's knowledge, using the known methods for producing polymers of olefins derived from renewable resources; this is because the olefins which constitute these polymers are obtained by carbohydrate fermentation or by biomass gasification; however, carbohydrate fermentation or biomass gasification does not make it possible to produce olefins having a number of carbon atoms ranging from 6 to 9.

According to the process of the invention, the olefin (a) is obtained from a fatty substance consisting of a plant oil and/or of an animal fat, which is extracted from renewable resources.

The process for producing the polymer according to the invention comprises the following steps:
A. treatment of said fatty substance so as to form an olefin (a) comprising a number of carbon atoms included in the range of from 6 to 9;
B. polymerization of the constituent monomers, at least one of which is the olefin (a).

During step A, the fatty substance extracted from renewable resources is treated so as to form an olefin (a). According to the process, this step A comprises a reaction in which an alcohol obtained from a fatty substance is dehydrated. In order to carry out this step A of the production process according to the invention, the step A of treatment of the fatty substance comprises one or more reactions so as to form a saturated alcohol, followed by a step of dehydration of this alcohol so as to form an olefin (a).

This dehydration reaction can be written:

R—CHOH—CH—R' ⇌ R—CH═CH—R'+H$_2$O with R being an alkyl group and R' being either a hydrogen atom or an alkyl group.

According to the process of the invention, at least one fatty acid of the fatty substance comprises an unsaturation of C═C type which is cleaved. This cleavage is carried out either by an oxidizing cleavage reaction or by a cracking reaction. Saturated species having a number of carbon atoms ranging from 6 to 9 and comprising, according to the conditions, an acid, ester, aldehyde or alcohol function are then formed.

Thus, the subject of the process of the invention is a process for producing a polymer, obtained from a fatty substance extracted from renewable resources and of which at least one fatty acid of the fatty substance comprises an unsaturation of C═C type, comprising the following steps:
A. production of olefin (a) having a number of carbon atoms ranging from 6 to 9 by means of the following steps:
  optionally, a step of hydrolysis or transesterification of the fatty substance so as to form, respectively, fatty acids or fatty esters;
  a reaction in which oxidizing cleavage or cracking of the fatty substance, of the fatty acids or of the fatty esters is carried out so as to form saturated species having a number of carbon atoms ranging from 6 to 9 comprising, according to the conditions, an acid, ester, aldehyde or alcohol function;
  an additional hydrogenation step when the function is an aldehyde, acid or ester, so as to form a saturated alcohol;
  a step in which the saturated alcohol obtained is dehydrated;
B. polymerization of the constituent monomers, at least one of which is said olefin (a).

Other advantages and elements for being able to implement the invention are reported in the detailed description hereinafter.

DETAILED DESCRIPTION OF THE INVENTION

The polymer according to the invention is obtained from an olefin (a) derived from renewable starting materials.

A renewable starting material is a natural, for example animal or plant, resource, the stock of which can be reformed over a short period on the human scale. In particular, it is necessary for this stock to be able to be renewed as quickly as it is consumed. Plant materials have the advantage of being able to be regenerated more rapidly than resources derived from fossil materials.

Unlike the materials derived from fossil materials, renewable starting materials contain $^{14}C$. All carbon samples taken from living organisms (animal or plant) are in fact a mixture of three isotopes: $^{12}C$ (representing approximately 98.892%), $^{13}C$ (approximately 1.108%) and $^{14}C$ (traces: $1.2 \times 10^{-10}$%). The $^{14}C/^{12}C$ ratio of living tissues is identical to that of the atmosphere. In the environment, $^{14}C$ exists in two predominant forms: in the form of carbon dioxide gas ($CO_2$), and in organic form, i.e. in the form of carbon incorporated into organic molecules.

In a living organism, the $^{14}C/^{12}C$ ratio is kept constant by the metabolism since the carbon is continually exchanged with the external environment. Since the proportion of $^{14}C$ is constant in the atmosphere, it is the same in the organism, as long as it is alive, since it absorbs this $^{14}C$ in the same way as the ambient $^{12}C$. The mean $^{14}C/^{12}C$ ratio is equal to $1.2 \times 10^{-12}$.

$^{12}C$ is considered to be stable, i.e. the number of $^{12}C$ atoms in a given sample is constant over time. $^{14}C$ is radioactive; the number of $^{14}C$ atoms in a sample decreases over time (t), its half-life being equal to 5730 years.

The $^{14}C$ content is substantially constant from the extraction of the renewable starting materials up to the production of the polymer based on olefin derived from renewable resources that is used in the invention and even up to the end of the use of the object comprising this polymer.

Consequently, the presence of $^{14}C$ in a material, irrespective of the amount thereof, gives an indication as to the origin of the molecules constituting it, namely whether they originate from renewable starting materials and not from fossil materials.

The amount of $^{14}C$ in a material can be determined by one of the methods described in the standard ASTM D6866-06 (Standard Test Methods for Determining the Biobased Content of Natural Range Materials Using Radiocarbon and Isotope Ratio Mass Spectrometry Analysis).

This standard comprises three methods of measuring organic carbon derived from renewable starting materials, referred to as "biobased carbon". The proportions indicated for the olefin comprising from 6 to 9 carbon atoms and the polymer of the invention are preferably measured according to the mass spectrometry method or the liquid scintillation spectrometry method described in this standard, and very preferably by mass spectrometry.

These measurement methods evaluate the ratio of the $^{14}C/^{12}C$ isotopes in the sample and compare it with a ratio of the $^{14}C/^{12}C$ isotopes in a material of biological origin giving the 100% standard, in order to measure the percentage of organic carbon in the sample.

Preferably, the olefin (a) used for producing the polymer according to the invention comprises an amount of carbon derived from renewable starting materials of greater than 20%, preferably greater than 50% by weight, relative to the total weight of carbon of the olefin comprising from 6 to 9 carbon atoms.

In other words, the olefin derived from renewable resources can comprise at least $0.24 \times 10^{-10}\%$ by weight of $^{14}C$, and preferably at least $0.6 \times 10^{-10}\%$ by weight of $^{14}C$.

Advantageously, the amount of carbon derived from renewable starting materials is greater than 75%, preferably equal to 100% by weight, relative to the total weight of carbon of the olefin (a) comprising from 6 to 9 carbon atoms.

Advantageously, the polymer according to the invention comprises an amount of carbon derived from renewable starting materials of greater than 20%, preferably greater than 50%, even more preferably greater than 75%, and very preferably equal to 100% by weight, relative to the total weight of carbon of the polymer.

According to the process of the invention, this renewable starting material is a fatty substance, for example a plant oil or an animal fat.

A fatty substance comprises triglycerides having the following form:

These triglycerides are triesters of a fatty acid R—COOH; the fatty substances thus comprise fatty acids in the ester form.

The plant oils are essentially present in various oil-producing plants, such as sunflower, rape, castor oil plant, bladderpod, olive, walnut, soya, palm tree, coriander, celery, dill, carrot, fennel or Limnanthes alba (meadowfoam).

The animal fats are derived from the terrestrial or marine animal world, and in the latter case, both in the form of fish and mammals and of algae. They are in general fats originating from ruminants, from fish, such as cod, or from marine mammals.

Plant oils are preferably used as fatty substances. It is common practice to distinguish two types of fatty substance: saturated fatty substances, in which no fatty acid comprises a C═C unsaturation, and unsaturated fatty substances, in which at least one fatty acid of the fatty substance comprises an unsaturation of C═C type. According to the process of the invention, at least one fatty acid of the fatty substance comprises an unsaturation of C═C type.

Advantageously, this fatty substance is a plant oil comprising fatty acids in ester form, chosen from ricinoleic acid, palmitoleic acid, oleic acid, erucic acid, linoleic acid or linolenic acid. According to one preferred embodiment of the invention, this fatty substance is a plant oil comprising ricinoleic acid.

By way of illustration, the amounts by weight of the various fatty acids included in the triglycerides of various plant oils or animal fats are given in table 1. It is specified that this fatty acid list is illustrative and that any type of plant oil or of animal fat known to those skilled in the art may be used.

| Name of acid | Coconut | Palm (fruit) | Palm (seed) | Tallow | Soya | Flax | Sunflower | Castor oil | Rape |
|---|---|---|---|---|---|---|---|---|---|
| Caprylic | 6 | 3 | | | | | | | |
| Capric | 7 | 3 | | | | | | | |
| Lauric | 47 | 50 | | | | | | | |
| Myristic | 18 | 16 | 1 | 3 | | | | | |
| Palmitic | 9 | 9 | 44 | 24 | 12 | 6 | 11 | 1 | 5 |
| Palmitoleic | | | | 6 | | | | | 1 |
| Stearic | 3 | 2 | 5 | 17 | 4 | 4 | 6 | 1 | 2 |
| Oleic | 8 | 15 | 39 | 44 | 23 | 22 | 29 | 4 | 59 |
| Linoleic - C18:2-delta 9,12 | 2 | 2 | 11 | 6 | 52 | 16 | 53 | 4 | 22 |
| Linolenic | | | | | 9 | 52 | 1 | 1 | 9 |
| Ricinoleic | | | | | | | | 89 | |

Mention may also be made, as fatty substances, of mustard seeds which comprise approximately 40% of erucic acid in ester form.

The process for producing the polymer according to the invention comprises the following steps:

A. treatment of said fatty substance so as to form an olefin (a) comprising a number of carbon atoms included in the range of from 6 to 9;
B. polymerization of the constitutive monomers, at least one of which is the olefin (a).

According to the process of the invention, it is also obviously possible to carry out steps of purification of the intermediate products or of the polymer according to the invention.

Fatty substances extracted from renewable resources are used to carry out the production process according to the invention. Many methods exist for extracting a fatty substance from a plant or from an animal. These fatty substances are commercially available. The oil can be extracted by firstly grinding the seeds so as to obtain a first part of the oil and a residue of ground seeds; this step is commonly called "trituration". A second part of the oil is preferably extracted from the residue of the ground seeds by means of a solvent, generally an alkane solvent, for example hexane.

Step A of the Production Process

In order to form the olefin (a) according to the process of the invention, a dehydration step is carried out in a reactor so as to form a mixture of alkene and water.

This dehydration step can be carried out in the presence of a dehydration catalyst, for example a γ-alumina-based catalyst, which may be acidic or basic, in the presence of the alcohols obtained from the starting materials of renewable origin.

The catalyst may be in the form of powder or of granules. The amount of Si in the catalyst is preferably less than 500 ppm. According to a first version of the invention, a basic catalyst, for example a barium-doped γ-alumina, is used to further increase the selectivity of the dehydration. According to a second version of the invention, an acidic catalyst is used to improve the reaction yield. An example of a catalyst suitable for the dehydration of these alcohols is in particular sold by the company Eurosupport under the trade name ESM 110®. It is an undoped trilobed alumina containing little residual $Na_2O$ (usually 0.04%).

The temperature and/or the pressure are chosen, inside the reactor, such that the alcohol is in vaporized form. The reaction in which the alcohol formed is dehydrated can be carried out, for example, in the temperature range included from 250 to 400° C. This dehydration can advantageously be carried out under partial vacuum, for example at a pressure of between 500 and 760 mmHg.

A heat-transfer fluid consisting of a dehydration-inert product can also be injected with the alcohol, this inert product being gaseous under the conditions of the process. Mention may be made, for example, of nitrogen, helium, argon, water, methane, propane, butane and the other aliphatic or aromatic hydrocarbons. For example, from 0.05 to 10 mol of inert product may be used per mole of alcohol introduced, and preferably from 0.15 to 3 mol. Preferably, the dehydration catalyst comprises at least one γ-alumina chosen with a volume of all the pores included in the γ-alumina of greater than 0.9 ml/g, at least one of the pores of which has a maximum radius included in the range of from 1 to 9 nm and at least one of the other pores of which has a maximum radius greater than 25 nm. Mention may be made, for example, of the Pural® KR1 catalyst produced by Sasol.

Advantageously, a step of purification of the olefin (a) obtained is carried out by means of known techniques, for example by means of a distillation step.

When a saturated alcohol of which the only alcohol function is in the alpha-position is dehydrated, a single isomer (an alpha-olefin) is obtained; when the saturated alcohol is not in the alpha-position, a mixture of two isomers is formed. In all cases, a lower number of isomers is obtained compared with the conventional processes of cracking and steam cracking of fossil resources.

A reaction in which the fatty substance is hydrolyzed or transesterified can optionally be carried out. During the reaction in which the fatty substance is hydrolyzed or transesterified, fatty acids or fatty esters, respectively, are formed with glycerol.

This reaction takes the following form, $R^4$ being H in the case of hydrolysis and an alkyl group in the case of transesterification:

The transesterification can be carried out with methanol or ethanol, advantageously with methanol. Preferably, this transesterification is carried out in a basic medium, for example in the presence of sodium hydroxide, it being possible for the amount of basic catalyst to be from 0.1% to 1% by weight of the reaction medium. It can be carried out by reacting the fatty substance in a stirred reactor in the presence of an excess of alcohol (for example methanol), preferably with a basic catalyst (such as sodium methoxide or sodium hydroxide). This transesterification reaction is preferably carried out at a temperature of between 40 and 120° C. In order to carry out the hydrolysis reaction, the fatty substance is preferably reacted in the presence of an excess of water, preferably with an acidic catalyst. The hydrolysis can be carried out, for example, at a temperature of between 10 and 100° C., preferably from 15 to 60° C., and very preferably from 20 to 50° C.

Preferably, the reactor is fed continuously in order to maintain the water/acid or alcohol/ester molar ratio above or equal to 2/1, for example from 3/1 to 10/1. At the end of the reaction, the glycerol is separated from the resulting mixture of fatty acids or of fatty esters by settling out, and these acids or esters are washed in order to remove the traces of glycerol. Advantageously, the products obtained are isolated, for example by distillation.

According to the process of the invention, a cleavage of the unsaturation of C=C type included in the fatty substance, the ester or the acid is carried out, this cleavage being carried out via a cracking reaction or via oxidizing cleavage, for example ozonolysis.

The ozonolysis reaction (nonequilibrated), which has as intermediate an ozonide (not represented), takes the following form:

Carboxylic acids, aldehydes and peroxides are formed according to the conditions. One advantage of this oxidizing cleavage process is that it is carried out at low temperature, thereby making it possible to limit the costs associated with the heat supplied to the reaction medium.

In order to carry out an ozonolysis reaction, the fatty substance, the acids or the esters are, in a first phase, solubilized in an organic solvent. In order to place the reactor under ozonolysis conditions, it is stirred in the presence of ozone. Any type of organic solvent, for example chosen from esters, acids, alcohols or dimethyl sulfoxide (DMSO) can be used for this reaction. Water can also be used as solvent. According to the miscibility of the reactants with the solvent, the reaction medium will be composed of a single phase or of an emulsion of one phase in another (this is the case, for example, for unsaturated esters in an aqueous solvent). It is preferably carried out in DMSO or a solvent of alcohol, methanol, ethanol, propanol, butanol, methoxyethanol, cyclohexanol or benzyl alcohol type; when the ozonolysis is carried out on the fatty ester, it is advantageous to use the alcohol R—OH corresponding thereto. This reaction can be carried out at low temperature, for example in the temperature range of between 20° C. and 60° C., preferably between 25 and 40° C. The ozonide is then formed.

In order to form the ozonolysis products, either an ozonide hydrolysis reaction or a reduction of the ozonide is carried out in a second phase.

It is possible to carry out an ozonide hydrolysis reaction with basic catalysis (for example using concentrated sodium hydroxide) while at the same time maintaining the reaction medium under low-temperature ozonolysis conditions. The final products are then formed. By carrying out a final ozonolysis step with the medium being acidified, a mixture of acids RCOOH and R'COOH is then obtained.

According to a second mode, it is also possible to carry out a reduction of the ozonide as described in application FR0854708.

This reduction can be carried out with zinc in acetic acid, with hydrogenation in the presence of a hydrogenation catalyst (Pd, for example) or with the aid of a reducing agent such as, for example, dimethyl sulfide (DMS). A mixture of aldehydes RCHO and R'CHO is obtained.

The preferred variant of this oxidizing cleavage step is reducing ozonolysis which can be carried out in the presence of zinc metal, in powder form, or else preferably in the presence of DMS in DMSO; this is because this DMS will be converted, during the reducing ozonolysis, to DMSO, it being possible for this DMSO to be readily re-used.

Other processes are also described in documents GB810571, WO2007/039481, U.S. Pat. Nos. 6,455,715 and 2,819,279, or else by Ackman et al., in the article *Ozonolysis of unsaturated fatty acids: I. Ozonolysis of oleic acid* (Canadian Journal of Chemistry, Vol. 39, 1961, p. 1956-1963).

For example, if the ozonolysis of linoleic acid or of a fatty substance containing linoleic acid is carried out, 1-hexanoic acid or hexanal is obtained among the products. In the same way, pelargonic acid or nonanaldehyde is formed from oleic acid.

It is advantageously possible to purify the products obtained at the end of the oxidizing cleavage step, for example by means of a distillation step.

In order to carry out a cracking reaction, the fatty substance, the ester or the acid is placed in the reactor and the cracking reaction is carried out by heating the reaction medium under pyrolysis conditions (for example under nitrogen), selecting the conditions, for example of temperature and of pH of the reaction solution, so as to obtain the desired products. Optionally, acid cracking catalysts, such as crystalline zeolite aluminosilicates, are used. The fatty substance cracking temperature may be included in the range of from 180 to 650° C.

According to the cracking conditions, carboxylic acids, aldehydes or saturated alcohols are formed.

For example, according to a first embodiment, the cracking of a plant oil comprising ricinoleic acid in ester form, such as castor oil, is carried out in a basic medium, for example, in the presence of sodium hydroxide, in a preferential temperature range of from 180 to 300° C., so as to form octan-2-ol. This cracking step can optionally be carried out on ricinoleic acid or a ricinoleic acid ester obtained by means of a step in which this plant oil is hydrolyzed or transesterified. This cracking step is described, for example, in documents U.S. Pat. Nos. 6,392,074 or 3,671,581.

According to a second preferred embodiment, the reaction of cracking a plant oil comprising ricinoleic acid in ester form, such as castor oil, is carried out by vaporizing it in the reactor in the presence of steam.

This cracking step can optionally be carried out by introducing, in place of the oil, ricinoleic acid or a ricinoleic acid ester, for example methyl ricinoleate obtained by transesterification of castor oil with methanol. This fatty acid or this fatty ester is obtained by means of a step of hydrolysis or transesterification of this plant oil. Preferably, the reaction for cracking castor oil or methyl ricinoleate is carried out.

The castor oil/water or alkyl ricinoleate/water weight ratio is preferably between 1 and 3. The reaction is carried out at a temperature of between 450 and 650° C., preferably between 450 and 575° C., for example from 500 to 575° C., generally for a period of 5 to 30 seconds. This cracking step is described, for example, in the work "Les Procédés de Pétrochimie" [Petrochemical processes] by A. Chauvel et al., published in the Editions TECHNIP (1986) in the section devoted to the synthesis of 11-aminoundecanoic acid. Heptaldehyde is obtained among the reaction products. It is possible to advantageously purify the products obtained at the end of the cracking step, for example by means of a distillation step.

With regard to the reactions in which the esters, acids or aldehydes are hydrogenated, they take the following form:

These hydrogenation reactions can be carried out by reacting the ester, the acid or the aldehyde obtained from the fatty substance in the presence of excess dihydrogen on a catalyst comprising CuO and ZnO. Advantageously, the CuO/ZnO ratio is between 0.2 and 2. Catalysts based on copper chromite, optionally doped with barium and/or with manganese, can also be used. Preferably, this hydrogenation step is carried out at a temperature of from 200 to 230° C. and at a pressure of from 3 to 5 mPa. The catalyst can be regenerated by bringing it into contact with steam.

Preferably, a step of separating the alcohol formed is carried out, for example by means of a distillation step.

Here are several examples of step A of the process according to the invention:

In a first example of the process according to the invention, where n is equal to 6, the fatty substance comprises an ester of linoleic acid in its C18:2-delta 9,12 form, and step A comprises the following steps:
  hydrolysis of this fatty substance so as to obtain the linoleic acid C18:2-delta 9,12;
  ozonolysis of the linoleic acid;

distillation of the ozonolysis products so as to obtain hexanoic acid or hexanaldehyde;

hydrogenation of the hexanoic acid or the hexanaldehyde so as to form hexan-1-ol;

dehydration of the hexan-1-ol so as to form 1-hexene.

In a second example of the process according to the invention, where n is equal to 7, the fatty substance is a plant oil comprising ricinoleic acid, preferably castor oil, and step A comprises:

an optional step of transesterification of this plant oil, for example by alcohol treatment in a basic medium, preferably in the presence of sodium hydroxide, so as to obtain alkyl ricinoleate;

cracking of this oil or of the alkyl ricinoleate in the presence of steam under pyrolysis conditions at a temperature ranging from 450 to 575° C. for 5 to 30 seconds so as to form heptaldehyde;

hydrogenation of the heptaldehyde so as to form heptan-1-ol;

dehydration of the heptan-1-01 so as to form 1-heptene.

In a third example of the process according to the invention, where n is equal to 8, the fatty substance is a plant oil comprising ricinoleic acid in ester form and step A comprises the following steps:

optional transesterification of this plant oil by alcohol treatment in a basic medium, preferably in the presence of sodium hydroxide, so as to obtain alkyl ricinoleate;

cracking of castor oil or of the alkyl ricinoleate in a basic medium under pyrolysis conditions at a temperature ranging from 180 to 300° C. so as to form octan-2-ol;

dehydration of the octan-2-ol so as to form a mixture comprising 1-octene and 2-octene.

In a fourth example of the process according to the invention, where n is equal to 9, the fatty substance is a plant oil which comprises oleic acid in ester form and step A comprises the following steps:

transesterification of this plant oil so as to form an oleic acid ester;

ozonolysis of the ester formed so as to form a pelargonic aldehyde or a pelargonic acid;

hydrogenation of the pelargonic aldehyde or of the pelargonic acid so as to form nonan-1-ol;

dehydration of the nonan-1-ol so as to form 1-nonene as olefin (a).

Step B of the Production Process According to the Invention

Advantageously, the olefin polymerization step B is a solution polymerization, fluidized-bed polymerization, slurry polymerization or high-pressure polymerization step.

The step B of polymerization of the olefin (a), optionally with the olefin (b), can be carried out in various ways according to the type of product to be produced.

The olefin (a) is advantageously an alpha-olefin; its number of carbon atoms is chosen from olefins containing from 6 to 9 carbon atoms.

According to one embodiment of the invention, the constituent monomers of the polymer comprise, in addition to the olefin (a), a comonomer (b) which is ethylene or propylene. The comonomer (b) is preferably ethylene.

The comonomer (b) is advantageously derived, at least partially, from renewable resources. In order to form ethylene or propylene, the teaching of application FR0702781, which relates to the production of carbon nanotubes, can be used. Their synthesis comprises the steps of:

a) synthesis of alcohol (ethanol and/or propanol) by fermentation of at least one plant material comprising sugars; and b) dehydration of the alcohol obtained in a) so as to produce, in a first reactor, a mixture of alkene (ethylene in the case of ethanol and propylene in the case of propanol) and of water: this dehydration step is generally carried out in the presence of a catalyst, which can in particular be silicalite-based for propanol or γ-alumina-based for ethanol. The comonomer (b) can also be synthesized by biomass gasification according to the teaching of application WO2008/067627.

The (a)/((a)+(b)) molar ratio is advantageously included in the range of from 0.0001 to 0.5, preferably from 0.001 to 0.3.

Generally, the more the level of olefin (a) is increased, the more the density of the polymer will tend to decrease.

According to one particularly advantageous embodiment, the comonomer (b) is ethylene and the polymer is polyethylene.

In the case of polyethylene, it is possible to have:

the high density polymer (HDPE) with a density generally of between 0.940 and 0.965 g/cm$^3$; this polyethylene is distinguished by a low degree of branching and consequently by strong intermolecular forces and by a high tensile strength. The low branching is provided by the choice of the catalyst and of the reaction conditions and the (a)/((a)+(b)) molar ratio is generally less than 0.5%;

the medium density polymer (MDPE) with a density generally of between 0.925 and 0.940 g/cm$^3$; this polyethylene exhibits good impact properties and the (a)/((a)+(b)) molar ratio is generally less than 1%;

the low density polymer (LDPE) with a density generally of between 0.915 and 0.935 g/cm$^3$; this polymer exhibits a high degree of branching of chains (short and long). This polyethylene exhibits a low tensile strength and an increased ductility and generally does not comprise olefin (a);

the linear low density polymer (LLDPE) with a density generally of between 0.900 and 0.940 g/cm$^3$; this polymer is in a substantially linear form with a large number of short branches and the (a)/((a)+(b)) molar ratio is generally between 0.1% and 3%;

the very low density polymer (VLDPE) with a density generally of between 0.860 and 0.910 g/cm$^3$; this copolymer is in a substantially linear form with a very large number of short branches and the (a)/((a)+(b)) molar ratio is generally between 3% and 50%, preferably between 3% and 30%.

Preferably, the polymer is chosen from HDPE, MDPE, LLDPE or VLDPE.

The known techniques for producing polymers based on olefins derived from fossil materials can be used for step B. The polymer is synthesized according to three preferred methods: the solution method, the slurry method and the fluidized-bed (gas phase) method, very particularly for the synthesis of the copolymers based on (a) and (b). High-pressure, free-radical polymerization methods (in an autoclave reactor or a tubular reactor) can also be used.

In the case of the solution, slurry and fluidized-bed methods, a catalyst is used which may be a Ziegler-Natta or metallocene catalyst, or even, to a lesser extent, a Phillips catalyst.

Ziegler-Natta catalysts conventionally consist of a halogenated derivative of a transition metal of group IV or V of the Periodic Table of Elements (titanium, vanadium) and of an alkylated compound of a metal of groups I to III.

Metallocene catalysts are single-site catalysts generally consisting of an atom of a metal that may be zirconium or titanium and of two cyclic alkyl molecules bonded to the metal; more specifically, the metallocene catalysts are usually composed of two cyclopentadiene rings bonded to the metal. These catalysts are frequently used with aluminoxanes as co-catalyst or activators, preferably methylaluminoxane (MAO). Hafnium can also be used as the metal to which the cyclopentadiene is attached. Other metallocenes can include transition metals of groups IVa, Va and Via. Lanthanide metals can also be used.

Phillips catalysts are obtained by depositing chromium oxide on a support (silica or silica aluminum) with a high specific surface area, of about 400 to 600 $m^2/g$. These catalysts are subsequently reduced and activated at very high temperature (400-800° C.).

The solution method can be carried out by introducing at least one olefin (a) with, optionally, one olefin (b) into an autoclave reactor, in the presence of at least one solvent. The reactor can operate adiabatically or can be equipped with an external cooler.

The catalyst used may be a Phillips catalyst, advantageously a Ziegler-Natta catalyst, or a metallocene catalyst.

The temperature of the reactor is generally between 150 and 300° C. and the pressure between 3 and 20 MPa.

At the reactor outlet, the gas enriched in monomer is returned to the inlet of the reactor and the liquid stream comprising the polymer is treated in order to separate the polymer from the solvent. The polymer is subsequently conveyed to an extruder.

According to the fluidized-bed or gas phase method, the reaction medium consists of particles of catalyst around which the polymer is formed. The polymer produced is maintained in the solid phase, while the olefins (a) and, optionally, (b) form the carrier gas of the fluidized bed. These olefins also make it possible to remove the heat from the reaction and also to control the molar mass.

The catalyst used may be a Ziegler-Natta, metallocene or Phillips catalyst.

The temperature of the reactor is generally between 80 and 105° C. and the pressure between 0.7 and 2 MPa.

For example, in the case of a polymer according to the invention based on ethylene and on an olefin (a), the process is carried out in a vertical reactor. The ethylene is compressed to the required pressure and introduced at the inlet (bottom part) of the reactor. The control of the pressure of the ethylene at the reactor inlet makes it possible to control the reaction pressure. The catalyst and the optional cocatalyst and the olefin (a) are introduced into the reactor.

At the reactor outlet, the gas mixture and the LLDPE are extracted from the fluidized bed and then the pressure is reduced in order to separate the polyethylene from the gases. The constituents of the gas mixture (ethylene and olefin (a)) are separated and optionally returned to the reactor. The LLDPE (solid) is purged, in order to remove any possible traces of ethylene, and conveyed to an extruder.

To produce LLDPE, use is preferably made of a metallocene catalyst, using, for example, a solution process or a fluidized-bed process.

The polymer can optionally be obtained from monomers different than the olefin (a) and, optionally, than the olefin (b).

The number-average molar mass of the polymer can be greater than 2000 g/mol. This polymer or a composition comprising same can be advantageously used to produce any type of molded, blow-molded or injection-molded component, a yarn, a film, a bag, a sachet, a multilayer structure, a container, a reservoir, a bottle, a sheath for an electric cable, a pipe or a tube, as an impact modifier, as a softening agent or as a binder.

According to another version of the invention, the number-average molar mass of the polymer is less than or equal to 2000 g/mol.

This polymer or a composition comprising same can be advantageously used for the production of engine lubricants, textile lubricants or plasticizers or in household products.

According to One Variant, the Polymer Obtained at the End of Step B is Subsequently Grafted As subsequently described, the grafting of the polymer is carried out with at least one grafting monomer chosen from unsaturated carboxylic acids or functional derivatives thereof, unsaturated dicarboxylic acids having 4 to 10 carbon atoms and functional derivatives thereof, C1-C8 alkyl esters or glycidyl ester derivatives of unsaturated carboxylic acids, and metal salts of unsaturated carboxylic acids.

Glycidyl methacrylate is preferred, or maleic anhydride is even more preferred, as grafting monomer.

According to one particular variant of the grafted polymer, use may be made of maleic anhydride comprising carbon atoms of renewable origin.

The maleic anhydride can be obtained according to the process described in application FR 0854896 by the applicant, comprising the following steps:
i) fermentation of renewable starting materials and, optionally, purification so as to produce a mixture comprising at least butanol;
ii) oxidation of the butanol to give maleic anhydride at a temperature generally between 300 and 600° C., by means of a catalyst based on oxides of vanadium and/or of molybdenum;
iii) isolation of the maleic anhydride obtained at the end of step b).

Conventionally, the microorganism used for the fermentation is a *Clostridium*, it will advantageously be *Clostridium acetobutylicum* or a mutant thereof.

The renewable starting materials used are preferably those comprising sugars, cellulose or hemicellulose.

Preferably, this butanol oxidation reaction is carried out in the presence of air or of another gas comprising molecular oxygen; even more preferably, the air or the other gas comprising molecular oxygen is present in a large excess.

Various known processes can be used for grafting a grafting monomer onto the polymer.

This can be carried out by heating the polymer (alone or as a mixture) at a high temperature, of approximately 100° C. to approximately 300° C., in the presence or in the absence of a solvent, with or without radical generators.

Suitable radical generators which can be used comprise peroxides, preferably peroxy esters, dialkyl peroxides, hydroperoxides or peroxyketals. These peroxides are sold by Arketna under the trademark Luperox®. Mention may be made, as examples of peroxy esters, of t-butyl peroxy-2-ethylhexanoate (Luperox 26), t-butyl peroxyacetate (Luperox 7), t-amyl peroxyacetate (Luperox 555), t-butyl perbenzoate (Luperox P), t-amyl perbenzoate (Luperox TAP) and OO-t-butyl 1-(2-ethylhexyl)monoperoxycarbonate (Luperox TBEC). By way of dialkyl peroxides, mention may be made of 2,5-dimethyl-2,5-di(t-butylperoxy)hexane (Luperox 101), dicumyl peroxide (Luperox DC), α,α'-bis(t-butylperoxy)diisopropylbenzene (Luperox F40), di(t-butyl) peroxide (Luperox DI), di(t-amyl) peroxide (Luperox DTA) and 2,5-dimethyl-2,5-di(t-butylperoxy)hex-3-yne (Luperox 130). An example of hydroperoxide is t-butyl hydroperoxide (Luperox TBH70). Use may be made, for example, as peroxyketal, of 1,1-di(t-butylperoxy)-3,3,5-trimethylcyclohexane (Luperox 231), ethyl 3,3-di(t-butylperoxy)butyrate (Luperox 233) or ethyl 3,3-di(t-amylperoxy)butyrate (Luperox 533).

The grafting reaction can then be carried out according to a batch solution process or a continuous process with a melt blending device.

Another subject of the present invention is a composition comprising the polymer according to the invention and, in addition, at least one additional polymer different than the polymer according to the invention and/or additional additive for improving the properties of the final material.

Among these additives are antioxidants, UV protecting agents, "processing" agents, for instance fatty amides, stearic acid and its salts, fluoropolymers (known as agents for preventing extrusion defects), defogging agents, antiblocking agents, such as silica or talc, fillers, such as calcium carbonate, and nanofillers, for instance clays, coupling agents, such as silanes, crosslinking agents, for instance peroxides, antistatic agents, nucleating agents, pigments, dyes, plasticizers, fluidizers, and flame-retardant additives, such as aluminum hydroxide or magnesium hydroxide. These additives can be present, for example, in contents of between 10 ppm and 100 000 ppm by weight relative to the weight of the final copolymer. Some of these additives can be introduced into the composition in the form of masterbatches.

The additional polymer can, for example, be a polyolefin, particularly an ethylene-based polyolefin.

When the polymer a has a number-average molar mass of greater than 2000 g/mol, it can, for example, be used in inks, as described in application US2007/0276060. In general, the polymer can also be used in the same way and for the same applications as the copolymers derived from fossil materials or compositions based on these copolymers that are already known. When (a) is copolymerized with (b), depending on the (a)/((a)+(b)) ratio, the polymer can, for example, be used to produce yarn, films, bags, sachets, multilayer structures, containers, molded, blow-molded or injection-molded components of any type, for instance reservoirs and bottles. The polymer can also be used in the electrical field (for example for producing sheaths for electric cables) or for producing pipes or tubes for transporting fluids. The polymer can also be used as an impact modifier, or as a softening agent for bringing softness to a material in polyolefin thermoplastic elastomers, or else it can be part of the composition of a binder.

When the polymer is an oligomer (number-average molar mass less than or equal to 2000 g/mol), it has good low-temperature flow, thermal stability, oxidation resistance and hydrolysis resistance properties, combined with a low volatility at high temperature and good friction behavior; this oligomer is also relatively nontoxic and miscible with most mineral oils, which makes it very suitable for uses as a lubricant, for example in engine or compressor oils or hydraulic systems. It can also be used as a plasticizer or in household product compositions.

EXAMPLE

An example of implementation of the process according to the invention is presented below.

Polyethylene a was prepared from ethylene and 1-heptene by carrying out steps A, B and C according to the process of the present application.

It is specified that this implementation does not in any way constitute a limitation of the process according to the present invention.

Starting from castor oil obtained by means of step A, a reaction in which the castor oil is transesterified is carried out by reacting methanol with the castor oil at 80° C., said reaction being catalyzed by sodium methoxide, in a tubular reactor with stirring. 100 kg of castor oil are introduced into the reactor. The methanol/ester molar ratio is maintained at 6 during the reaction. After one hour, the methyl ricinoleate is separated from the glycerol and is washed with water in order to remove the last traces of glycerol.

Cracking of the methyl ricinoleate is then carried out by vaporizing at 215° C. in the reactor; mixing is carried out with steam at 600° C. (ester/water ratio=2) and the reaction is carried out for 10 seconds at 500° C.

After distillation, heptanal is recovered and the heptanal is subsequently hydrogenated by introducing 10 kg of heptanal into a reactor in order to hydrogenate it.

After separation of 1-heptanol from the other compounds, the 1-heptanol is injected, in order to dehydrate it, into a tubular reactor having a diameter of 127 mm under vacuum (pressure of approximately 0.8 bar), containing a catalytic bed at a temperature of 345° C., consisting of a layer of Eurosupport ESM110® alumina, representing a volume of 12 700 cm$^3$ and a weight of 6500 g, the hourly space velocity (ratio of the flow rate by volume of heptanol to the volume of catalyst) being 1 h$^{-1}$.

The mixture of water and 1-heptene produced in the reactor is cooled in a heat exchanger, before being conveyed to a gas-liquid separator where the 1-heptene and the water are separated.

A step of purifying the 1-heptene is performed before carrying out the polymerization step C of the process. This step is represented diagrammatically in FIG. 1.

Figure 1:
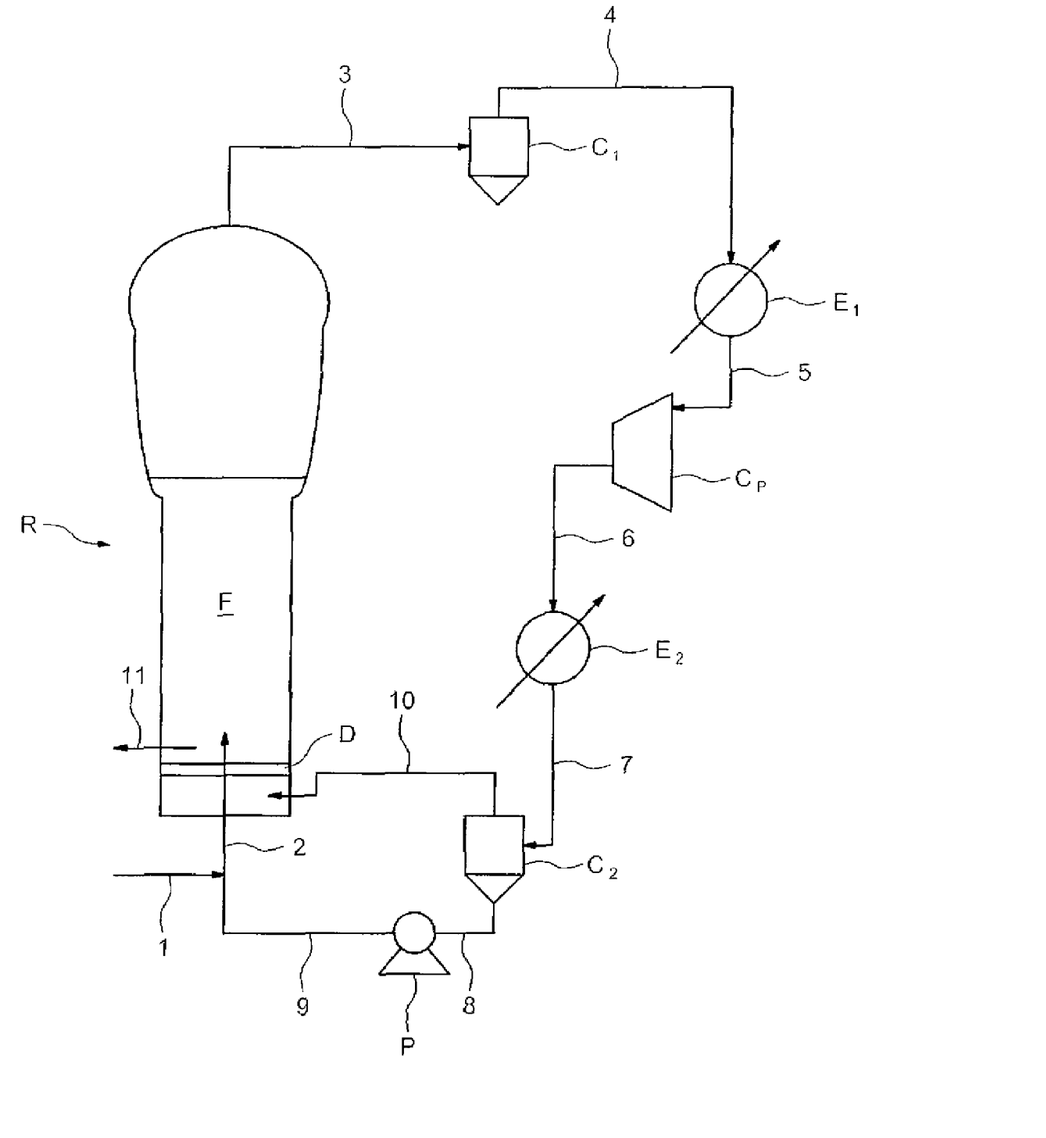
FIG. 1 is a flow diagram illustrating the step of purifying the 1-heptane prior to carrying out the polymerization step C.

This implementation is performed by means of the following device comprising a reactor R, and a gas recycling circuit comprising two cyclone separators C1 and C2, two heat exchangers E1 and E2, a compressor Cp and a pump P.

The reactor R comprises a distribution plate (or distributor) D which defines a bottom zone which is a zone for entry of the gases and liquids and a top zone F where the fluidized bed is located.

The distributor D is a plate in which there are holes; this distributor is intended to homogenize the flow rate of the gases entering the reactor.

According to this implementation, a mixture of ethylene and olefin (a) (1-heptene) is introduced via the pipe 1, then via the pipe 2 into the reactor, where the fluidized-bed polymerization is carried out.

Said fluidized bed comprises the catalyst and preformed polymer particles; this bed is maintained in a fluidized state by means of an ascending gas stream originating from the distributor D. The volume of the fluidized bed is kept constant by withdrawal of the polyethylene formed, by means of the discharge pipe 11.

The polymerization of the monomers is an exothermic reaction; the temperature inside the reactor is kept constant by controlling the temperature of the (recycled) gas introduced into the reactor via the pipe 10.

The gas comprising the ethylene and 1-heptene molecules which have not reacted and a transfer agent (hydrogen) leaves the reactor and enters the recycling circuit via the pipe 3. This gas is treated in the cyclone separator C1 in order to remove any possible fine particles of polyethylene which might have been carried over. The treated gas is then introduced, via the pipe 4, into a first heat exchanger E1 where it is cooled.

The gas leaves the heat exchanger E1 via the pipe 5, and enters a compressor Cp, and the fluid re-emerges via the pipe 6.

The fluid is cooled in a second heat exchanger E2.

The pipe 7 brings the fluid from the exchanger E2 to the cyclone separator C2. The gases are separated from the liquids in the cyclone separator C2, the liquids leave the cyclone separator C2 via the pipe 10 and are introduced into the reactor R, and the gases leave the cyclone separator C2 via the pipe 8, enter the pump P and are then introduced, via the pipe 9 and then via the pipe 2, into the reactor.

The composition of the fluid at the reactor inlet, observed over three successive passes, was the following:

|  | Test No. 1 | Test No. 2 | Test No. 3 |
| --- | --- | --- | --- |
| Ethylene (mol %) | 70.1 | 70.0 | 66.1 |
| 1-heptene (mol %) | 0.85 | 1.00 | 0.94 |
| Nitrogen (mol %) | 29.04 | 28.99 | 32.96 |
| Hydrogen (ppm) | 550 | 500 | 170 |

The reaction was carried out under the following operating conditions:
 pressure in the reactor: 25 bar
 temperature in the reactor: 90° C.
 gas speed: 0.6 m/s
 fluidized bed height: 15 m
 temperature of fluids at reactor inlet: 40° C.

According to these conditions, the yield obtained is, for the various tests, approximately 120 kg/m³/h.

The polyethylene obtained has the following properties:

|  | Test No. 1 | Test No. 2 | Test No. 3 |
| --- | --- | --- | --- |
| Melt flow index (g/10 min) | 1.0 | 3.4 | 0.10 |
| Density (g/cm³) | 0.9154 | 0.9164 | 0.9115 |

The melt flow index is measured according to standard ASTM D 1238 (190° C.; 2.16 kg).

The density is measured according to standard ASTM D 1505.

The invention claimed is:

1. A process for producing a polymer, comprising the following steps:
 A. obtaining a fatty substance from a renewable resource, wherein at least one fatty acids of the fatty substance comprises a C=C unsaturation;
 B. producing a $C_{6-9}$ olefin (a) having a number of carbon atoms (n) ranging from 6 to 9 by means of the following steps:
  optionally performing a hydrolysis or a transesterification of the fatty substance so as to form, respectively, fatty acids or fatty esters;
  reacting by the cracking or oxidizing cleavage of the fatty substance, the fatty acids or the fatty esters, in which said reacting is carried out so as to form saturated species having a number of carbon atoms ranging from 6 to 9 comprising, according to the conditions, an acid, ester, aldehyde or alcohol function;
  performing an additional hydrogenation step when the function is an aldehyde, acid or ester, so as to form a saturated alcohol;
  dehydrating the saturated alcohol to form a $C_{6-9}$ olefin (a);
 C. polymerizing one or more monomers, at least one of which is said olefin (a).

2. The process as claimed in the claim 1, in which the fatty substance is a plant oil comprising fatty acids in ester form, selected from the group consisting of ricinoleic acid, palmitoleic acid, oleic acid, linoleic acid, erucic acid, and linolenic acid.

3. The process as claimed in claim 1, in which n is equal to 7 or 8, wherein the fatty substance is a plant oil comprising ricinoleic acid in ester form.

4. The process as claimed in claim 1, in which the transesterification reaction is carried out with methanol.

5. The process as claimed in claim 1, in which the transesterification reaction is carried out in a basic medium.

6. The process as claimed in claim 1, in which n is equal to 7, wherein step B comprises the following steps:
 cracking of a plant oil comprising ricinoleic acid in ester form, in the presence of steam under pyrolysis conditions at a temperature ranging from 450 to 575° C. for 5 to 30 seconds so as to form heptaldehyde;
 hydrogenation of the heptaldehyde so as to form heptan-1-ol;
 dehydration of the heptan-1-ol so as to form 1-heptene as olefin (a).

7. The process as claimed claim 1, in which n is equal to 8, wherein step B comprises the following steps:
 cracking of a plant oil comprising ricinoleic acid in ester form in a basic medium under pyrolysis conditions at a temperature ranging from 180 to 300° C. so as to form octan-2-ol;
 dehydration of the octan-2-ol so as to form a mixture comprising 1-octene and 2-octene.

8. The process as claimed claim 1, starting from a fatty substance comprising an ester of linoleic acid in its C18:2-delta 9,12 form, in which n is equal to 6, wherein step B comprises the following steps:
 hydrolysis of this fatty substance so as to obtain linoleic acid C18:2-delta 9,12;
 ozonolysis of the linoleic acid;
 distillation of the ozonolysis products so as to obtain hexanoic acid or hexanaldeyde;
 hydrogenation of the hexanoic acid or the hexanaldehyde so as to form hexan-1-ol;
 dehydration of the hexan-1-ol so as to form 1-hexene.

9. The process as claimed in claim 1, in which n is equal to 9, starting from a plant oil comprising oleic acid in ester form, wherein step B comprises the following steps:
 transesterification of this plant oil so as to form an oleic acid ester;
 ozonolysis of the ester formed so as to form a pelargonic aldehyde or a pelargonic acid;
 hydrogenation of the pelargonic aldehyde or of the pelargonic acid so as to form nonan-1-ol;
 dehydration of the nonan-1-ol so as to form 1-nonene as olefin (a).

10. The process as claimed in claim 1, wherein the polymerization step C is carried out by solution polymerization, fluidized-bed polymerization, slurry polymerization or high-pressure polymerization.

11. The process as claimed in claim 1, in which the monomers of step C further comprise a comonomer (b) of formula $C_pH_{2p}$ in which p is an integer chosen from the range of from 2 to 3.

12. The process as claimed in claim 11, in which the comonomer (b) is derived, at least partially, from renewable resources.

13. A polymer obtained by the process of claim 1, wherein the amount of carbon derived from renewable starting materials, measured according to standard ASTM D 6866-06, is greater than 20%, relative to the total weight of carbon of the polymer.

14. The polymer as claimed in claim 13, wherein the monomers further comprise an olefin (b), having a number of carbon atoms ranging from 2 to 3.

15. The polymer as claimed in claim 14, wherein the (a)/((a)+(b)) molar ratio is between 0.0001 and 0.3.

16. The process as claimed in claim 6, wherein the plant oil comprising ricinoleic acid in ester form, is castor oil, or of alkyl ricinoleate.

17. The process of claim 11, in which comonomer (b) of formula $C_pH_{2p}$ is ethylene.

18. The polymer of claim 13 wherein the amount of carbon derived from renewable starting materials, measured according to standard ASTM D 6866-06, is greater than 50% relative to the total weight of carbon of the polymer.

19. The polymer as claimed in claim 14, wherein olefin (b), is produced from renewable resources.

* * * * *